Figure 5:
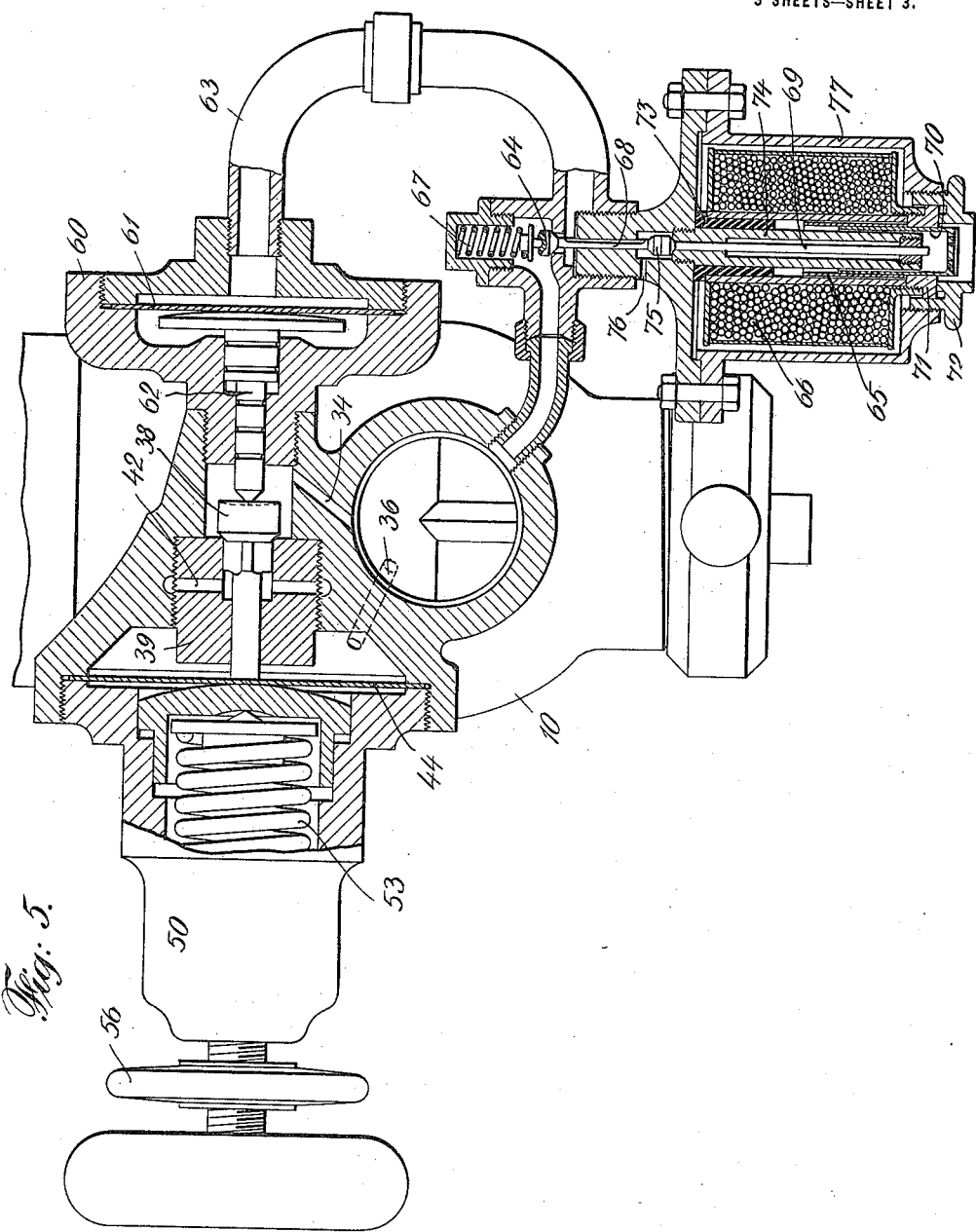

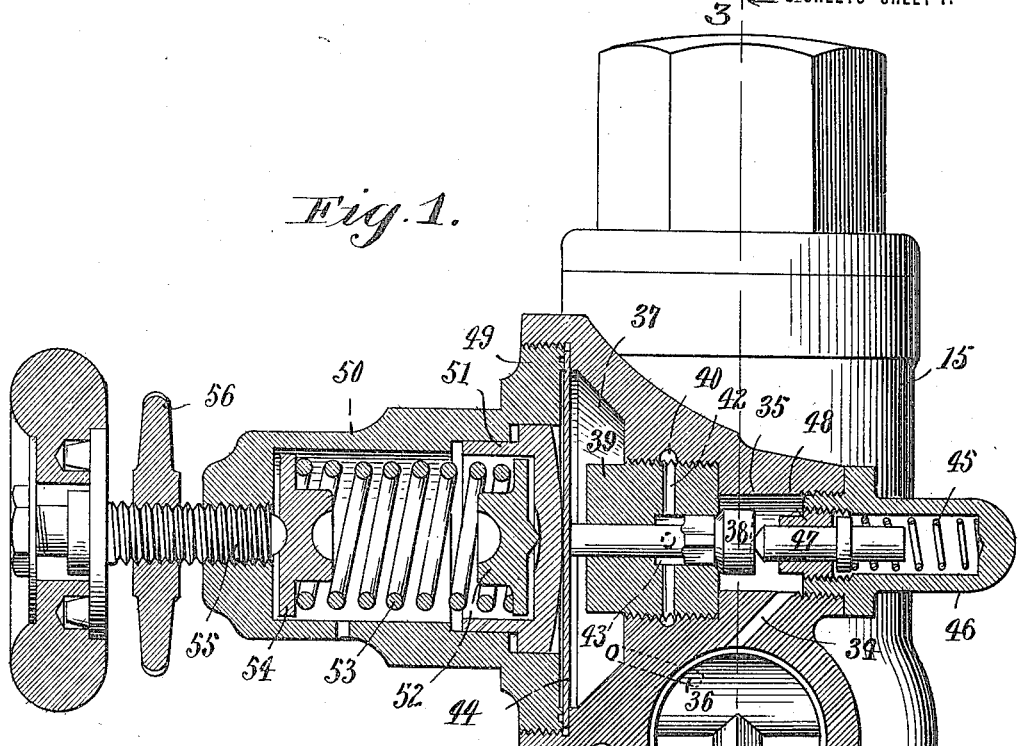
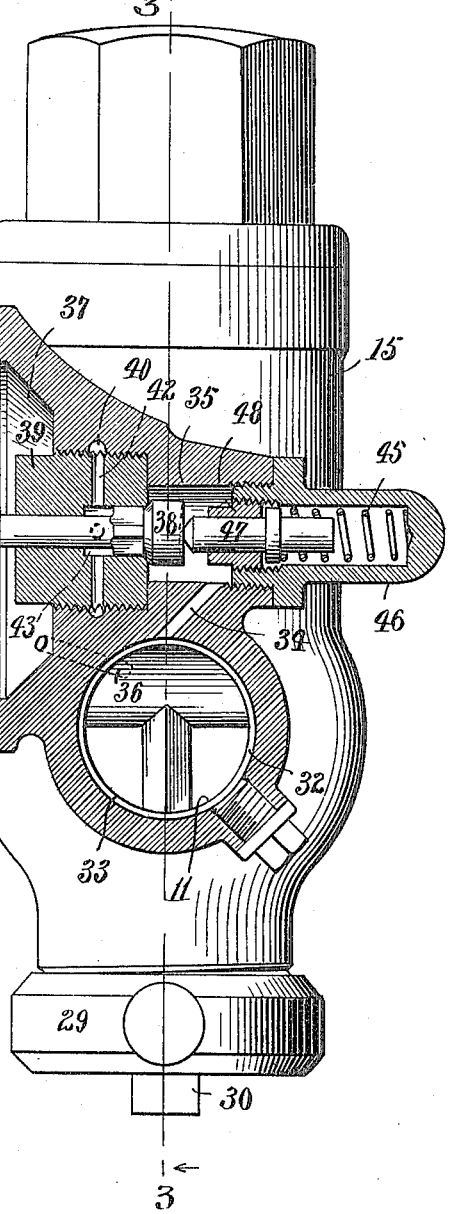
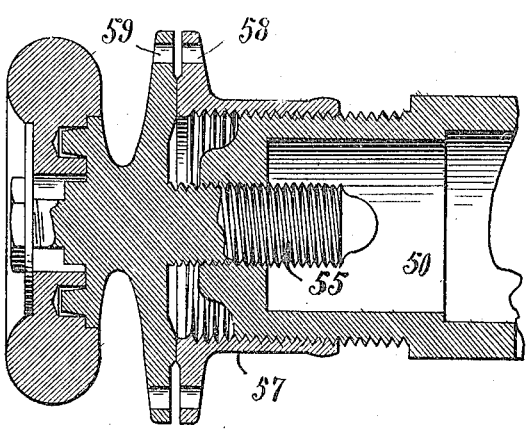
G. W. COLLIN.
REGULATING VALVE.
APPLICATION FILED OCT. 10, 1911.
1,161,190.
Patented Nov. 23, 1915.
3 SHEETS—SHEET 1.
Fig. 1.
Fig. 2.
Witnesses
Elbert O. Hull
E. Earle Garlick
Inventor
George W. Collin
By Chamberlain & Newman
Attorneys

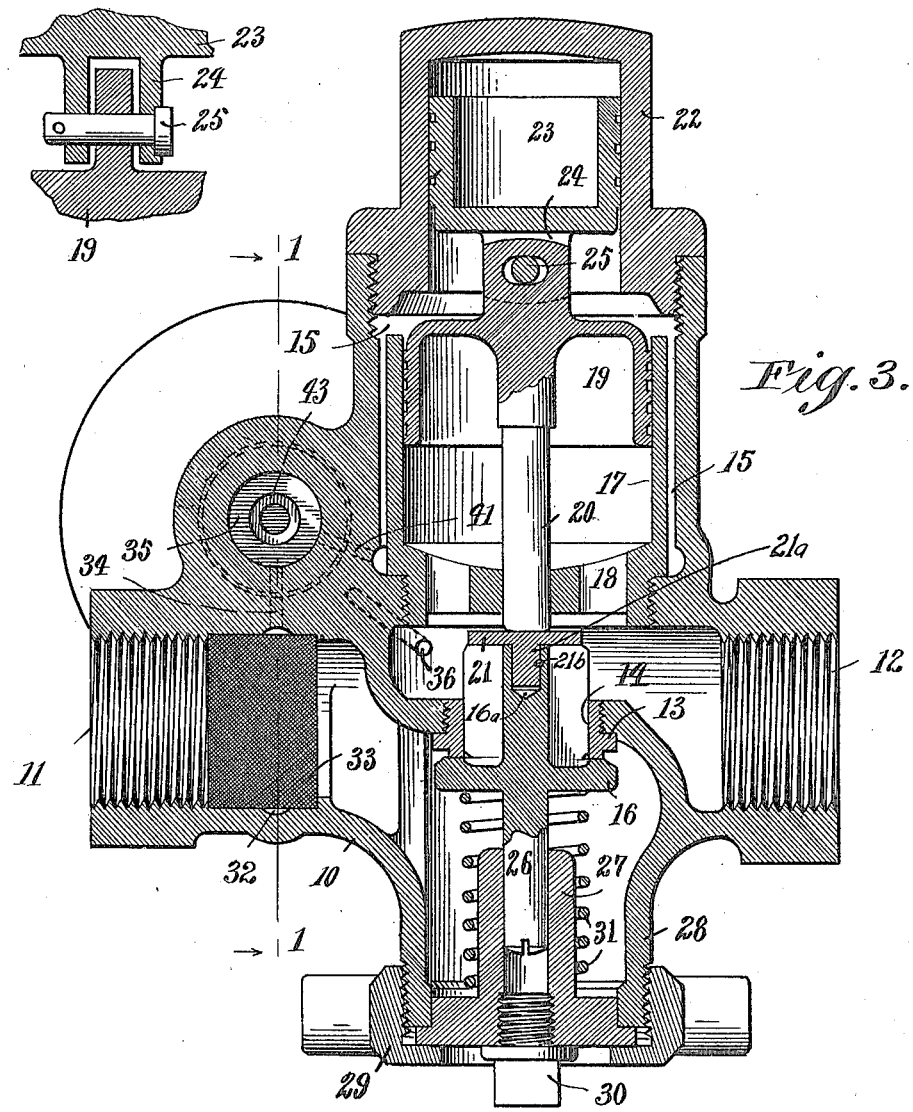

G. W. COLLIN.
REGULATING VALVE.
APPLICATION FILED OCT. 10, 1911.

1,161,190.

Patented Nov. 23, 1915.
3 SHEETS—SHEET 3.

Witnesses:
C C Houghton.
M. V. Lowe.

Inventor
George W Collin.
By his Attorneys
Chamberlain & Newman.

UNITED STATES PATENT OFFICE.

GEORGE W. COLLIN, OF BRIDGEPORT, CONNECTICUT, ASSIGNOR TO THE COLLIN VALVE CO., OF BRIDGEPORT, CONNECTICUT, A CORPORATION OF MAINE.

REGULATING-VALVE.

1,161,190.　　　　　Specification of Letters Patent.　　Patented Nov. 23, 1915.

Application filed October 10, 1911. Serial No. 653,802.

*To all whom it may concern:*

Be it known that I, GEORGE W. COLLIN, citizen of the United States, and resident of Bridgeport, in the county of Fairfield and State of Connecticut, have invented certain new and useful Improvements in Regulating-Valves, of which the following is a specification.

This invention relates to improvements in regulating valves, and particularly to improvements in regulating valves designed for use as reducing valves, to reduce steam, water, air, or gas pressures or the pressures of other fluids.

In the accompanying drawings the invention is shown embodied in a valve of the general type shown in my former Patent No. 949,294, dated February 15, 1910; and in part my invention embodies improvements upon the structure shown in that patent.

The objects of my invention are to improve the construction of reducing valves, and particularly the construction of reducing valves of the type shown in my said prior patent, to so construct the valve that it shall be free from liability to derangement from any cause, to provide for easy inspection and removal of various parts of the valve, to so construct the valve that it will be closed by rush of fluid through it even in the event of failure of the spring which normally tends to hold such valve closed, to so construct and arrange the operating and controlling devices of the valve that the same are protected from foreign matter such as may be carried by the steam or other fluid controlled by the valve, to provide means whereby the valve may be opened and closed by the action of a thermostat or other external controlling device, and in general to make the valve simple, easy to construct and assemble, easy to inspect and clean, durable and entirely reliable.

With these and other objects in view, the invention consists in the construction and novel combination and arrangement of parts hereinafter described and illustrated in the accompanying drawings, and pointed out in the appended claims, it being understood that various changes in form, proportion, size, and minor details of construction within the scope of the claims, may be resorted to without departure from the spirit of the invention, or sacrificing any of the advantages thereof.

I will now describe the invention with reference to the accompanying drawings, illustrating one structure embodying such invention, and will then point out the novel features in claims.

In said drawings: Figure 1 shows a sectional elevation of my improved valve, the section being taken upon the line 1—1 of Fig. 3. Fig. 2 is a detail sectional view showing an alternative form of locking means for holding in any position to which it may be adjusted, the regulating screw of the loading spring. Fig. 3 shows a central vertical section through the valve on the line 3—3 of Fig. 1, the pilot valve being therefore sectioned, and the diaphragm case of the loading mechanism being shown in the background. Fig. 4 is a detail sectional view of the pivotal connection between the head of the main piston and the cushion plunger, this view being taken on a plane at right angles to the plane of section of Fig. 3. Fig. 5 is a detail sectional view, the section being taken on the line 1—1 of Fig. 3, the same as for Fig. 1, this Fig. 5 showing means for opening and closing the valve by the action of an external controlling device, such for example as a thermostat.

As before stated, the valve may be successfully used for controlling the flow of various fluids under pressure. However, the greatest field of application for the valve is probably for the control of the flow of steam under pressure, for which service the valve has been particularly designed; and in the following description I will describe the valve as used for the control of the flow of steam under pressure; though it will be understood that the valve operates in the same manner for controlling the flow of other fluids under pressure.

The valve comprises a valve body having the usual inlet and outlet and the usual division wall, separating the inlet and outlet chambers, but provided with a port for connecting these chambers, with which port is operatively arranged a valve for closing such port. I customarily provide a spring which tends to hold said valve closed, said valve being located on the inlet side of the said division wall, so that the pressure in the inlet chamber also tends to hold said valve closed. And I further provide said valve with a plate, in the path of fluid flowing through the said port in the division wall, whereby such fluid, acting upon said plate, also tends to hold the valve closed.

On the outlet side of the valve casing I provide a piston chamber and piston therein, the piston provided with means bearing against the valve of the division-wall port, said piston so arranged that fluid pressure acting upon its rear side tends to open the said valve; and I provide a passage extending from the inlet side of the valve casing to the space in rear of the said piston, for communicating to the rear side of said piston fluid pressure to operate the piston; and I provide a pilot valve arranged to control the flow of fluid through this passage. Such pilot valve may be operated by various means, as for example by a magnet, as shown for example in my application for Letters Patent Sr. No. 564,475, filed June 1, 1910; but I customarily control said pilot valve by a diaphragm, exposed on one side to the pressure of the outlet chamber of the valve casing, and exposed on the other side to the action of loading means, such for example as a loading spring.

Referring now to the accompanying drawings, numeral 10 designates the body of the valve, 11 the inlet thereof and 12 the outlet thereof; which inlet and outlet are shown as threaded in the usual manner for connection to steam pipes or the like, and are shown as arranged in line with one another. The valve casing is provided with the usual division wall separating the inlet and outlet chambers and includes a transverse flat portion in which is removably secured a ported valve seat bushing 13.

Numeral 14 designates the port of this bushing, which is the main valve port.

16 designates the valve for closing this port 14.

On the outlet side of the valve, but with its axis preferably in line with the axis of the valve port 14, there is a piston chamber 15. This piston chamber I customarily provide with a liner 17 having suitable openings 18 whereby the interior of said liner is connected with the outlet chamber of the valve; and this liner is customarily screwed into the valve body at its lower end, and the walls of the main portion of this liner are of equal thickness upon all sides, and are spaced away from the side walls of the chamber 15 so as to allow steam within said chamber to circulate freely all around the liner so as to insure equal expansion of the metal of said liner on all sides. The bore of this liner 17 is smoothly finished to receive the piston 19, said piston being designed to move axially in said liner. Said piston is provided with a stem 20, passing through a suitable guide opening in the inner end of the liner 17, and this stem at its end bears against a plate 21 provided on the outlet side of the valve 16. The purpose of this plate 21 will be shown hereafter.

At its outer end, the piston chamber 15 is provided with a removable hollow end cap 22, screwing into the end of the piston chamber 15, and having within it a cushion cylinder in which works a cushion piston 23 connected to the outer side of piston 19 by means of lugs 24 and a pin 25 passing loosely through a laterally elongated aperture, in a lug formed on the outer side of the piston 19. This pivotal connection between the cushion piston and the piston 19, obviously allows each piston to follow freely its respective bore, so that no binding of either piston may occur. The main valve 16 is provided with a central projecting stem 26 fitted to move in the bore of a guide 27 seated in the end of the extension 28 of the valve body. This guide 27 is normally held in place by means of a nut 29, screwing upon the end of the extension 28. The guide 27, being held within the casing only by nut 29, may be alined with the valve 16 before the nut 29 is screwed up. This construction therefore obviates binding of the valve stem 26 in guide 27 on the one hand, or binding of the valve in the seat bushing 13 on the other hand. The end of the valve extension 26 has a key slot formed in it, whereby a screw driver or other suitable tool may be introduced through the bore of guide 27, to rotate the valve 16 for grinding said valve to its seat, or for any other purpose. A plug 30 normally closes the end of the bore of the guide 27.

I customarily provide a spring 31, surrounding the guide 27 and bearing against the base of said guide, and against the valve 16, which spring tends to hold said valve seated. However, I have also provided said valve 16 with the plate 21 whereby, even if said spring 31 be omitted from the valve, or if said spring should break or should lose strength, so that the valve 16 drops wide open when pressure is cut off, yet when steam is admitted to the valve through inlet 11 the rush of steam through the port 14, acting upon plate 21, will hold the valve closed or against the stem 20 of piston 19 In function, the plate 21 is integral with the valve 16; but for facility of manufacture, it is preferable to form said plate 21 as a separate member, as shown. For the purpose of securing said plate 21 to the valve 16, and for centering same with respect to the valve, the valve is provided in its end with a socket 16ᵃ, and the plate 21 is provided with a stem 21ᵃ seated in such socket and held therein by means of a transverse pin 21ᵇ.

33 designates a cylindrical strainer, located in the inlet chamber of the valve, over an annular recess 32 in the wall of said inlet chamber, from which annular recess a port 34 leads to the chamber 35 of the pilot valve. 38 designates this pilot valve and 39 designates a removable bushing, containing the valve seat and port with which pilot valve 38 coacts, said bushing screwing into the larger end of the pilot valve chamber 35, as clearly shown in Fig. 1. An annular groove 40 is provided in the wall of the chamber into which this bushing 39 fits, and a port 41 (see particularly Fig. 3) leads from this groove 40 to the piston chamber 15 in rear of the piston 19. Several radial ports 42 connect the bore 43 of bushing 39 with the annular groove 40. The pilot valve is provided with the usual radial guide wings which engage the sides of the bore 43 and insure the proper seating of said pilot valve on the beveled valve seat provided on bushing 39. The pilot valve, when so seated, prevents the passage of fluid from port 34 into bore 43 and thence through port 41 to the rear side of the piston 19.

It will be noted that the radial ports 42 of the valve seat bushing 39 terminate in the threaded portion of that bushing, and that the groove 40 (forming substantially a part of port or duct 41) is within the threaded portion of the wall of the pilot valve chamber. This location of the ports 40 and 42 is advantageous, in that it is, naturally, easy to make a tight joint between the threaded portion of bushing 39 and the threaded wall of the pilot valve chamber; thus preventing escape of steam or other fluid around the valve seat bushing, into diaphragm chamber 37. The inner end of the valve seat bushing 39 abuts against a shoulder of the pilot valve chamber, as clearly shown in Fig. 1, and therefore a tight joint is formed at this shoulder, between the valve seat bushing and the walls of the pilot valve chamber, thereby obviating leakage of steam or other fluid, past the end portion of the valve seat bushing, into port 40. By the construction illustrated, therefore, the bushing 39 forms a tight joint with one shoulder only of the pilot valve chamber, and nevertheless leakage is prevented both from said pilot valve chamber and from the ports of the valve seat bushing and port 40 into the diaphragm chamber 37.

In some reducing valves heretofore devised, wherein a valve seat bushing has been employed, it has been found necessary to make joints between two shoulders of the valve seat bushing and two corresponding shoulders of the valve casing. Both valve casing and valve seat bushing being rigid, it has been found extremely difficult, in such cases, to insure tight joints at both shoulders of the valve seat bushing. Such difficulty is overcome, in my construction, by causing the radial ports of the valve seat bushing to emerge in the threaded portion of that valve seat bushing, and by locating the port 40—41, registering with the radial ports of the valve seat bushing, in a threaded portion of the wall of the pilot valve chamber.

As previously stated, this pilot valve may be operated by various devices; but I have shown it arranged to be operated by a diaphragm 44 located in a suitable recess of the valve body, and held in such recess by the end of a spring-case 50 screwing into said recess. The end of the stem of the pilot valve bears against this diaphragm. A port 36 is provided for connecting the space on the inner side of the diaphragm with the outlet chamber of the valve body, so that said diaphragm is exposed on one side to the pressure of the outlet chamber. Said diaphragm is exposed on its other side to the pressure of a loading spring 53. Between the end of said spring and the diaphragm a chambered hub 51 is provided and within the chamber of said hub another hub 52 is provided. The outer end of said spring 53 bears against a bearing piece 54 normally resting against the end of an adjusting screw 55 mounted in the end of the spring case 50. It will be obvious that by turning the screw 55, the pressure exerted by the spring 53 upon the diaphragm may be varied as desired.

In the construction shown in Figs. 1 and 3, the pilot valve 38 is pressed toward its seat by a spring 45 contained within the closure plug 46 (which closure plug screws into an aperture in the valve body and closes the chamber of said valve body within which is the head of the pilot valve); said spring 45 acting upon a pin 47 bearing against the head of the pilot valve. This pin is held in place in the closure plug by a threaded bushing 48 which screws into the inner end of the closure plug 46 and is adapted to engage a shoulder formed on the pin 47, so as to prevent said pin from dropping out when the closure plug is removed for any reason. This bushing 48 also forms the guide for the said pin 47.

A lock nut 56 is provided on the adjusting screw 55 of the loading spring, whereby said screw may be clamped in any position to which it may have been adjusted. Or, alternatively, I use the construction shown in Fig. 2, comprising a lock nut 57 arranged to screw over the outer surface of the spring case 50, the threads of this lock nut 57 and spring case 50 having a pitch different from that of the threads of the screw 55. The hand wheel of the screw 55 has in it holes 59, and the lock nut 57 has a flange provided with corresponding holes, these holes being of such size that when in registry the hasp of a padlock or other suitable locking device may be passed through them. Since the screw threads of the lock nut and screw 55 are of different pitch, it will be apparent that when a locking device engages registering holes of the head of the screw, and the flange of the lock nut, it is impossible to rotate the screw.

The operation of the valve as thus described is as follows: When steam is first turned on to the valve, to admit such steam to the discharge side of the valve, that is to cause valve 16 to open, it may be necessary to screw in screw 55 somewhat, so as to cause diaphragm 44 to press the pilot valve away from its seat; whereupon steam or other fluid under pressure, will pass from the inlet chamber of the valve through port 34 and past the pilot valve to port 41 and thence to the rear side of the piston 19, whereby said piston is caused to move inward and so to open valve 16. The screw 55 is then adjusted so that the spring 53 exerts such pressure on the diaphragm as will cause the pilot valve to open whenever pressure in the discharge chamber of the valve body falls to any desired and predetermined minimum. Whenever the pressure in the discharge chamber of the valve body rises slightly above this predetermined minimum, such pressure communicated through port 36 to the inner side of the diaphragm 44, moves said diaphragm backward against the pressure of spring 53, and spring 45 then presses pin 47 against the head of the pilot valve and causes said pilot valve to seat. As soon as the pilot valve seats the pressure behind the piston 19 begins to decrease, owing to condensation or inevitable leakage, and the pressure of the fluid in the discharge chamber of the valve body, acting through ports 18 against the inner face of the piston 19, moves said piston outward, whereupon valve 16 is closed by spring 31 or by the action of the steam or other fluid, passing through valve port 14, on plate 21; and once said valve 16 is closed, the pressure on the inlet side of the valve, which is greater of necessity than the pressure on the outlet side of said valve, tends to hold valve 16 closed. The balance between the forces, tending to move the diaphragm 44 in the one direction or the other, may be made quite delicate, and therefore this reducing valve may be adjusted so as to maintain practically uniform pressure in its outlet chamber.

Since the main valve, 16, closes from the inlet side of its port, and is held closed, when seated, by the pressure in the inlet chamber, unless opened by the action of piston 19, and since said piston 19 and the cushioning piston 23 are located on the outlet side of the valve body, the cap 22, cushioning piston 23, and valve-actuating piston 19 may all be removed while the valve 16 is under pressure of fluid in the inlet chamber, with perfect safety. Likewise, the spring case 50 and diaphragm 44 may be removed while the main valve is so under pressure; and so may the valve-seat bushing 39 and the pilot valve, also the closure plug 46 or the diaphragm chamber 60 of Fig. 5; the escape of fluid through port 34 when bushing 39 or closure plug 46 or diaphragm chamber 60 is removed being so slight as to be negligible. It is therefore very easy to inspect, clean, and, if necessary, replace, the various parts which operate or control the main valve, while the valve is in service.

The piston 23 acts as a cushion piston to prevent too rapid motion of piston 19 and to prevent vibration or "chattering" of valve 16. Heretofore such cushion pistons have been employed, as, for example, in the valve shown in my Patent No. 949,294; but heretofore such cushion pistons have been located on the inlet and lower side of the valve, and so have been exposed to any grit, scale, dirt or the like that might be carried into the valve passages by the steam or other fluid passing through said passages; for which reason the location of the cushion piston on the inlet side of the valve has been found disadvantageous. By locating such cushion piston and chamber on the outlet and upper side of the valve, these disadvantages are overcome, and thereby the cushion piston and chamber are taken out of the direct path of the flow of the steam or other fluid, and are given a location where there is practically no flow of steam or other fluid; and moreover the strainer 33 precludes the passage of dirt, grit, scale or the like to the cushion piston or chamber.

It will be noted that all of the devices for controlling and operating the main valve are out of the main path of the stem and are protected by the strainer from foreign matter carried by the steam, thus giving assurance of long continuity of service.

This valve lends itself readily for automatic or distant control. In Fig. 5 I have illustrated means for such control. To this end, the closure cap 46 of Fig. 1 is replaced by a diaphragm casing 60, said diaphragm casing being provided with a diaphragm 61 which on one side bears against a plunger 62 adapted to bear against the head of the pilot valve 38 in the same manner as does the pin 47 of Fig. 1. Upon the opposite side of the diaphragm 61, the diaphragm chamber is connected by a pipe 63 with fluid-pressure-supply means, such as the inlet chamber of valve body 10; and flow through this pipe 63 is controlled by a valve 64 arranged to be opened by the armature 65 of a magnet 66, a spring 67 tending to hold valve 64 closed normally. There is a space around the stem 68 of valve 64 sufficient for the flow of fluid from pipe 63; but when valve 64 is raised, such flow is prevented by a second valve, 75; while when valve 64 is closed, valve 75 is open, so venting pipe 63 to the external air through a vent 76, and permitting rapid response of diaphragm 61 to closing of valve 64. It will be seen that when valve 64 is open, pressure is communicated through pipe 63 to diaphragm 61, and thereby the pilot valve 38 is held seated against the pressure of spring 53. But when valve 64 is closed, and valve 75 opened, spring 53 opens the pilot valve, unless the pressure communicated through port 36 from the outlet chamber of the valve body to the diaphragm 44 be sufficient to prevent such opening of the pilot valve.

It will be obvious that the circuit of magnet 66 may be controlled by any suitable means, such for example as a thermostat, or time switch, or hand switch, or any other suitable device; also that valves 64 and 75 may be operated by means other than the magnet.

The means just described for opening and closing the main valve by valve-controlled fluid-pressure-actuated means operating upon the pilot valve, is claimed in a companion application filed October 10, 1911, Sr. No. 653,803.

The particular construction of solenoid magnet and plunger armature, illustrated in Fig. 5, for operating valves 64 and 75, is one which I have found especially suitable for the purpose, and is described and claimed in my application filed June 1, 1910, Sr. No. 564,475. The solenoid is inclosed within a protecting case, 77, usually formed of magnetic material, such as cast iron, and is provided with an inwardly-projecting core 73, usually formed of soft iron, which concentrates the lines of force, acting on the plunger armature, so materially increasing the efficiency of action of the solenoid. The plunger armature, 65, is hollow, and is provided with a cage 70 the lower end of which is adapted to engage and raise the extension 69 of the valve stem 68. The solenoid armature 65 is held from dropping too far by the collar 71 held in place by the cap 72. The extension 69 of the valve stem slides within a guide bushing, 74, usually formed of brass, the extension 69 being usually formed of another metal which slides well over brass.

What I claim is:—

1. The combination in a regulating valve, of a casing having an inlet and outlet with a ported division wall therebetween, and a piston chamber extended out from one side, a valve within the casing to close the port of the wall, a piston operatively mounted in the piston chamber and bearing a stem to engage the valve, a removable cap closing the chamber and having a cylindrical chamber formed therein, and a plunger operatively mounted in the said cylindrical chamber and loosely connected to the piston so as to regulate the movement of the same by the cushion formed in the chamber back of the plunger.

2. The combination in a regulating valve, of a casing having an inlet and outlet with a ported division wall therebetween, a main valve and piston for operating the same, a pilot valve intermediate of the valve inlet and piston chamber, a removable casing plug in which the pilot valve is located and a closure plug for the opposite side of the pilot valve chamber, having within it a pin and a spring that bears against the pin which is operatively mounted within the plug, the pin yieldably bearing against the pilot valve and tending to hold it against its seat.

3. The combination in a regulating valve, of a casing having an inlet and outlet with a ported division wall therebetween, and having also a pilot valve chamber, a main valve, fluid-pressure-actuated means for operating the same, a pilot valve for said fluid-pressure-actuated means, a removable casing plug in which the pilot valve is located, closing one end of the pilot valve chamber, and a closure plug for the opposite end of the pilot valve chamber, having within it a pin and a spring that bears against the pin, which is operatively mounted within the plug, the pin yieldably bearing against the pilot valve and tending to hold it against its seat.

4. The combination in a regulating valve, of a casing having an inlet and outlet with a ported division wall therebetween, and having also a pilot valve chamber, a main valve, fluid-pressure-actuated means for operating the same, a pilot valve for said fluid-pressure-actuated means, a removable casing plug in which the pilot valve is located, closing one end of the pilot valve chamber, and a closure plug for the opposite end of the pilot valve chamber, a bushing closing the inner end of said closure plug, a pin slidably mounted within said bushing, a spring that bears against the pin, said spring being operatively mounted within said closure plug, the pin yieldably bearing against the pilot valve and tending to hold it against its seat.

5. A regulating valve of the class described comprising the combination with a valve body having inlet and outlet chambers with a ported division wall therebetween, a main valve, and actuating means for said main valve comprising a piston located within a piston chamber of the valve body, on the upper side of the main valve, of a cushioning device for cushioning the action of such main valve, comprising a cylinder and piston located in rear of and above the said valve actuating piston, said cushioning piston having a laterally free connection with the main piston whereby binding of either piston is avoided.

6. A regulating valve of the class described, comprising the combination with a valve body having inlet and outlet chambers with a ported division wall therebetween, a main valve, and actuating means for said main valve comprising a piston located within a piston chamber of the valve body, on the upper side of the main valve, of a cushioning device for cushioning the action of such main valve, comprising a cylinder and piston located in rear of and above said valve actuating piston, said cushioning piston and valve actuating piston having a pivotal connection, which is loose laterally, whereby binding of either piston is avoided.

7. A regulating valve of the class described, comprising the combination with a valve body having inlet and outlet chambers with a ported division wall therebetween, a main valve, and actuating means for said main valve comprising a piston located within a piston chamber of the valve body, on the outlet side of the main valve, said valve body having a screened duct leading from the inlet chamber to the rear of said piston, and a pilot valve controlling the flow through said duct, of cushioning means for said main valve comprising a cylinder and piston located in rear of said valve-actuating piston, said cushioning piston loosely connected to said valve actuating piston.

8. A regulating valve such as described, comprising the combination, with a valve body, having inlet and outlet chambers with a ported division wall therebetween, a main valve and fluid-pressure-operated means for operating said main valve, said valve body having a pilot valve chamber located out of line with said main valve and operating means thereof, and terminating at both ends in the exterior surface of the valve body, said pilot valve chamber connected to said valve-actuating means, of a removable valve-seat bushing screwing into said pilot valve chamber, and closing one end of such chamber, a pilot valve mounted in said bushing and having a stem projecting through such bushing to and beyond the end of the bushing, pilot-valve-actuating means acting upon the so-extended end of the pilot valve, a closure at the other end of the pilot valve chamber, and yielding means carried by such closure tending to hold the pilot valve seated.

Signed at Bridgeport in the county of Fairfield and State of Connecticut this 9th day of October A. D., 1911.

GEORGE W. COLLIN.

Witnesses:
C. M. NEWMAN,
I. L. MOREHOUSE.

Copies of this patent may be obtained for five cents each, by addressing the "Commissioner of Patents, Washington, D. C."